March 12, 1940.  J. W. GALLOWAY  2,193,588

THERMOSTAT

Filed March 14, 1938

Inventor

James W. Galloway,

By G. C. Kennedy,

Attorney

Patented Mar. 12, 1940

2,193,588

UNITED STATES PATENT OFFICE 2,193,588

THERMOSTAT

James W. Galloway, Cedar Falls, Iowa

Application March 14, 1938, Serial No. 195,805

1 Claim. (Cl. 297—12)

My invention relates to improvements in thermostatic devices, and an object of my improvements is to furnish a novel and useful, likewise inexpensive device of this character, convenient for use in governing the delivery of water by valvular means.

This object I have accomplished by the means which are hereinafter described and claimed, and which are illustrated in the accompanying drawing.

It will be understood that various changes may be effected in my said device without departing from the protection of my invention as set forth in the claim.

My thermostatic device has an open frame with a medial reach 1, with parallel side parts bent in the same direction, then bent convergingly at 3 and to have narrowly spaced end members or furcations 7. Sectional plates 2, spaced apart at their approximated ends to supply inwardly opening seats, are secured to the inner faces in alinement of the side parts by rivets 4 or other means, but open seats may be provided in the frame by other means.

Figure 1:
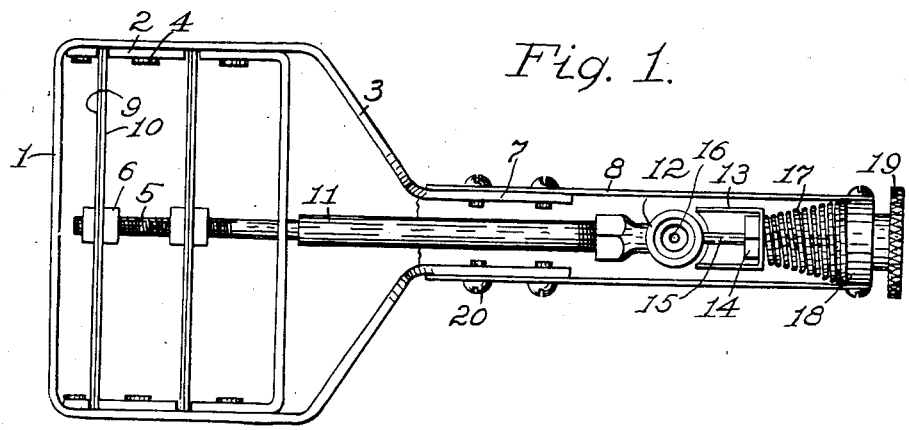
Fig. 1 is a top plan of my improved thermostat as connected operatively with and controlling a valvular device for the variable adjustment of a liquid, but it will be understood that my invention is not appropriated solely to this use, but may be of avail in combination with any adjustable means of mechanism otherwise.

I have shown in Fig. 1 two bimetallic thermostatic elements each composed of a connected pair of bars 9 and 10, and having their terminations loosely seated in the seat spaces between the sectional plates 2. One of the plates 2 has a cross connecting part integral with a like plate opposite, and this cross connection and the bimetallic plates 9—10 are medially apertured in alinement, to receive therethrough a threaded end part of a stem 5, with nuts seated on the thread bearing against opposite faces of said plates 9 and 10, for relative adjustments of the stem to the frame.

Figure 3:
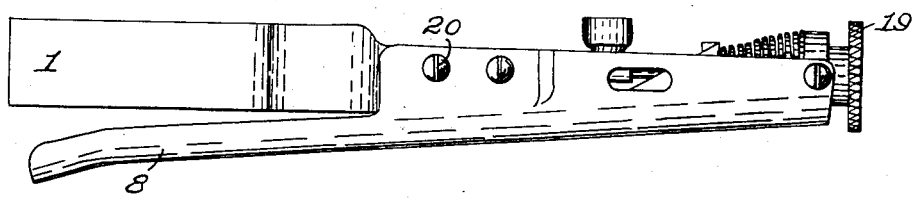
Fig. 3 is a side elevation of the elements as shown in Fig. 1.

As shown in Figs. 1 and 3, a liquid delivery inclined trough 8 has a receiving end secured by screws to an anchoring disk 18. This disk has a central bearing aperture interiorly threaded to receive the outer threaded part of a stem 15 whose inner end part traverses a side aperture in a valve-connection 12, and this end part, when the knurled finger disk 19 is turned, may be propelled through the coupling part of the member 12 to more or less close or open the delivery opening 16 which delivers into the trough. The member 12 has connection with a supply pipe not shown. The enlarged part 11 of the stem 5 is terminally threaded to fit the coupling part of the valve-chamber 12.

It will be seen that while the stem 5 and 11 is connected to the pair of bimetal bars 9—10 medially angularly, the valve body 12 is not connected to the stem 15. This permits the resilient controlling coiled spring 17 to be more or less compressed between the disk 18 and an abutment device 13 and 14 mounted on the stem 15, but this valve controlling device is not specifically claimed herein.

Figure 2:
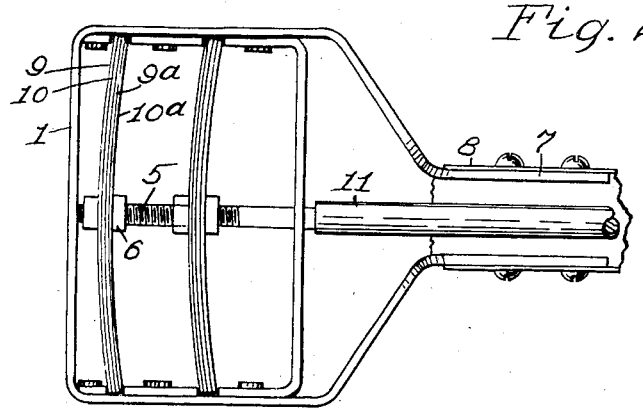
Fig. 2 is a like top plan of my thermostat with the valvular device removed or broken away, the bimetallic elements being of a larger plurality than the like elements shown in Fig. 1.

When my above described thermostat device is mounted within a hot air chamber of a furnace with the valvular parts and their supply located without, the heat in varying acts upon the bimetallic bars 9 and 10, or as shown in Fig. 2, upon one or more sets of bars 9, 10, 9a and 10a, and in case of increasing heat, these bars are outwardly curved in a direction to more or less shift the stem parts 5 and 11 with the connected member 12, whereby the stem end 15 more or less clears the valve port 16, permitting more liquid to escape into the trough 8.

My thermostat thus operates effectively in the usual manner, but as the assemblage of the bimetallic elements with a short frame therefor takes but little room, it may be used in restricted places without interference with other objects. This type of frame and transverse bimetallic bars therein may be otherwise shaped and arranged, and of a minimum cost due to the simplicity of its elements.

I claim:

A thermostat, comprising in combination, a bar frame of looped shape with parallel arms, a medially apertured strut end-connected to and between said arms, the loop members having along their inner faces opposite indented open seats, spaced bimetallic strips, medially apertured, and having their ends loosely seated in said seats, a medial longitudinal sectional shaft traversing the apertures in said strut and said strips and adjustably connected to the strips, a rigid cross-connection between the ends of said arms, and adjustable resilient linked elements connected operatively to said shaft and said cross-connection and manually operable to vary the tension thereof.

JAMES W. GALLOWAY.